United States Patent
Maeda

(10) Patent No.: US 11,470,510 B2
(45) Date of Patent: Oct. 11, 2022

(54) PACKET TRANSMISSION SYSTEM, TRANSMISSION APPARATUS, TRANSMISSION-PATH SWITCHING METHOD, AND TRANSMISSION-PATH SWITCHING PROGRAM

(71) Applicant: NEC CORPORATION, Tokyo (JP)

(72) Inventor: Yuichi Maeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 44 days.

(21) Appl. No.: 16/878,055

(22) Filed: May 19, 2020

(65) Prior Publication Data
US 2020/0374758 A1    Nov. 26, 2020

(30) Foreign Application Priority Data

May 22, 2019  (JP) .............................. JP2019-095811

(51) Int. Cl.
*H04W 28/20*     (2009.01)
*H04L 41/0896*  (2022.01)
*H04W 40/34*     (2009.01)

(52) U.S. Cl.
CPC ......... *H04W 28/20* (2013.01); *H04L 41/0896* (2013.01); *H04W 40/34* (2013.01)

(58) Field of Classification Search
None
See application file for complete search history.

(56) References Cited

U.S. PATENT DOCUMENTS

| | | | |
|---|---|---|---|
| 9,699,074 B2 * | 7/2017 | Zhang | H04L 41/145 |
| 2016/0028615 A1 * | 1/2016 | Lee | H04L 51/34 |
| | | | 370/237 |
| 2016/0065461 A1 * | 3/2016 | Zhang | H04L 45/64 |
| | | | 709/223 |

FOREIGN PATENT DOCUMENTS

| | | | |
|---|---|---|---|
| EP | 0699006 A1 * | 2/1996 | |
| JP | 2009-219079 A | 9/2009 | |
| JP | 2014-086884 A | 5/2014 | |

OTHER PUBLICATIONS

"Series G: Transmission Systems And Media, Digital Systems And Networks", ITU-T, G.8013/Y.1731, Operation, administration and maintenance (OAM) functions and mechanisms for Ethernet-based networks, Nov. 2018, pp. 1-104.

* cited by examiner

*Primary Examiner* — Ajit Patel
(74) *Attorney, Agent, or Firm* — Sughrue Mion, PLLC

(57) ABSTRACT

Provided is a packet transmission system including: terminal apparatuses; a first transmission path connected to the terminal apparatuses and including a first wireless zone; a second transmission path connected to the terminal apparatuses and including a second wireless zone; a bandwidth monitoring unit configured to monitor bandwidth information of the first wireless zone and bandwidth information of the second wireless zone; and a path switching unit configured to determine respective minimum bandwidth values of the first transmission path and the second transmission path on the basis of the bandwidth information of the first wireless zone and the bandwidth information of the second wireless zone, and to determine through which of packet transmission paths packets are transmitted on the basis of results of the determination of the respective minimum bandwidth values.

5 Claims, 5 Drawing Sheets

PACKET TRANSMISSION SYSTEM, TRANSMISSION APPARATUS, TRANSMISSION-PATH SWITCHING METHOD, AND TRANSMISSION-PATH SWITCHING PROGRAM

INCORPORATION BY REFERENCE

This application is based upon and claims the benefit of priority from Japanese patent application No. 2019-095811, filed on May 22, 2019, the disclosure of which is incorporated herein in its entirety by reference.

TECHNICAL FIELD

The present disclosure relates to a packet transmission system, a transmission apparatus, a transmission-path switching method, and a transmission-path switching program.

BACKGROUND ART

Japanese Unexamined Patent Application Publication No. 2009-219079 (Patent Literature 1) discloses a communication system that achieves communication path redundancy by using two carrier networks, specifically, by causing one communication carrier to cooperate with another communication carrier. In this communication system, apparatuses dedicated to carrier access (user access apparatuses) are installed at users' sites, and the carriers are switched to each other.

Between the user access apparatuses at both ends in the networks, OAM (Operation Administration and Maintenance) and APS (Automatic Protection Switching) at the Ethernet (trademark) level are implemented. Each of the user access apparatuses checks health of the two carrier networks with the OAM, and performs switching to still communicable one of the carrier networks with the APS when detecting disconnection of either one of the carrier networks.

Further, Japanese Unexamined Patent Application Publication No. 2014-86884 (Patent Literature 2) discloses a network device that utilizes link aggregation in which a single logical port is established by a plurality of physical ports that connect network devices to each other. In this network device, the physical ports to be used for transmitting frames are fixedly set in correspondence to key information relating to the frames on the basis of allocation information. By determining through which of the physical ports the frames are output on the basis of the key information of the received frames, load on the physical ports can be distributed.

Still further, the network device according to the technology disclosed in Patent Literature 2 is allowed to have a redundant configuration depending on setting of the allocation information. In case where an active physical port cannot communicate any longer by line failure or the like, the physical port that has been unable to communicate any longer can be switched to a backup physical port by changing the allocation information. By doing so, the frames can continue to be transmitted.

In the communication system as disclosed in Patent Literature 1, in which the communication path is caused to be redundant, in many cases, a line that has poor stability and a high capacity (such as a wireless transmission path in the E-Band) is used as a main line, and a line that has a low capacity and high stability (such as a wireless transmission path in the Licensed-Band) is used as a backup line. Thus, a bandwidth decrease by influence of weather or the like is likely to occur in the main line.

In Patent Literature 1, even in case where the bandwidth decrease occurs in the main line, switching to the backup line is not performed unless the communication failure is detected. Thus, in case where congestion occurs in the main line to cause buffer-memory exhaustion, frame loss of a main signal may occur.

In addition, in the network device as disclosed in Patent Literature 2, in a case where a transmission path includes a plurality of wireless transmission apparatuses connected in series to each other, even when a bandwidth decrease occurs in a certain one of wireless zones by the influence of weather or the like, the transmission path for the frames is maintained unless failure occurs in the physical ports in the network device. Thus, in case where congestion occurs in the transmission path to cause the depletion of the buffer memory, the frame loss of the main signal may occur.

SUMMARY

In view of the problems as described above, an object of the present disclosure is to provide a packet transmission system, a transmission apparatus, a transmission-path switching method, and a transmission-path switching program that allow transmission paths to be switched to each other even in case where a bandwidth decrease occurs in either one of the transmission paths.

According to an aspect of the present disclosure, there is provided a packet transmission system including:
  terminal apparatuses;
  a first transmission path connected to the terminal apparatuses and including a first wireless zone;
  a second transmission path connected to the terminal apparatuses and including a second wireless zone;
  a bandwidth monitoring unit configured to monitor bandwidth information of the first wireless zone and bandwidth information of the second wireless zone; and
  a path switching unit configured to determine respective minimum bandwidth values of the first transmission path and the second transmission path on the basis of the bandwidth information of the first wireless zone and the bandwidth information of the second wireless zone, and to determine through which of packet transmission paths packets are transmitted on the basis of results of the determination of the respective minimum bandwidth values.

According to another aspect of the present disclosure, there is provided a transmission apparatus to be connected in series to terminal apparatuses, and to establish a transmission path including a plurality of wireless zones.

The transmission apparatus includes a plurality of transmission apparatuses, each of the plurality of transmission apparatuses includes
  a bandwidth monitoring unit configured to monitor corresponding bandwidth information of a corresponding one of the plurality of wireless zones, and to notify one of the terminal apparatuses of the corresponding bandwidth information, and
  a bandwidth comparison unit configured to compare the corresponding bandwidth information and subsequent bandwidth information received from a subsequent one of the plurality of transmission apparatuses with each other, and each of the plurality of transmission apparatuses is configured to output a smaller one of the corresponding bandwidth information and the subsequent bandwidth information.

According to still another aspect of the present disclosure, there is provided a transmission-path switching method including:

monitoring bandwidth information of a first wireless zone in a first transmission path and bandwidth information of a second wireless zone in a second transmission path, the first transmission path and the second transmission path being connected to terminal apparatuses;

determining respective minimum bandwidth values of the first transmission path and the second transmission path on the basis of the bandwidth information of the first wireless zone and the bandwidth information of the second wireless zone; and determining through which of packet transmission paths packets are transmitted on the basis of results of the determination of the respective minimum bandwidth values.

According to yet another aspect of the present disclosure, there is provided a transmission-path switching program for causing a computer to execute:

a process of monitoring bandwidth information of a first wireless zone in a first transmission path and bandwidth information of a second wireless zone in a second transmission path, the first transmission path and the second transmission path being connected to terminal apparatuses;

a process of determining respective minimum bandwidth values of the first transmission path and the second transmission path on the basis of the bandwidth information of the first wireless zone and the bandwidth information of the second wireless zone; and a process of determining through which of packet transmission paths packets are transmitted on the basis of results of the determination of the respective minimum bandwidth values.

According to the present disclosure, it is possible to provide a packet transmission system, a transmission apparatus, a transmission-path switching method, and a transmission-path switching program that allow transmission paths to be switched to each other even in case where a bandwidth decrease occurs in either one of the transmission paths.

BRIEF DESCRIPTION OF DRAWINGS

The above and other aspects, features and advantages of the present disclosure will become more apparent from the following description of certain example embodiments when taken in conjunction with the accompanying drawings, in which.

EMBODIMENTS

Figure 1:
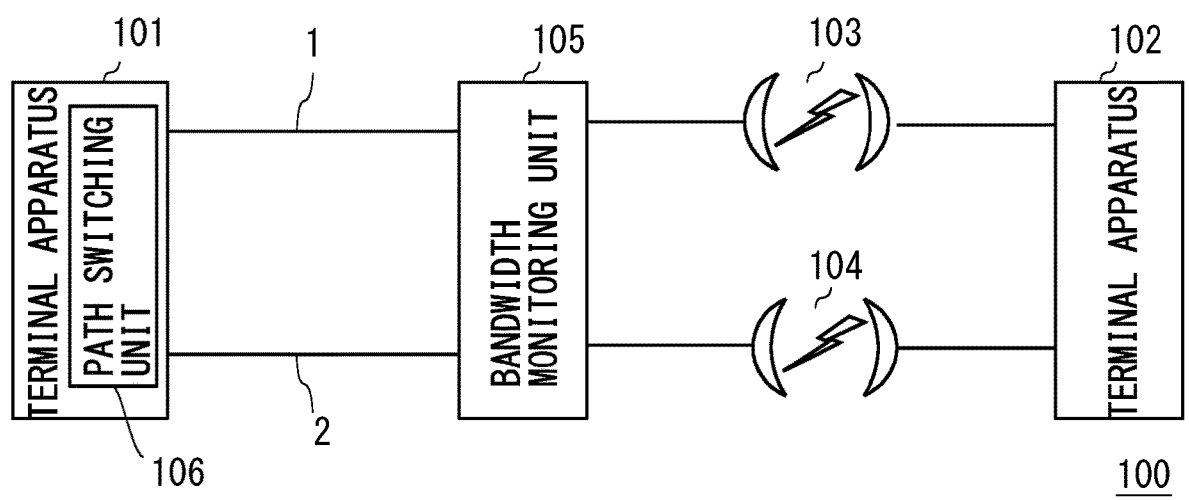
FIG. 1 is a block diagram showing a configuration of a packet transmission apparatus according to example embodiments of the present disclosure.

Example embodiments according to the present disclosure are described hereinafter with reference to the drawings. For the sake of better understanding of the description, the description and the drawings may be omitted or simplified as appropriate hereinafter. Further, each of the elements shown as blocks of functions to execute various processes in the drawings may be a hardware configuration such as a CPU (Central Processing Unit), a memory, or other lines. Still further, the present disclosure may be carried out by causing the CPU to execute an arbitrary process in accordance with a computer program. Thus, those of ordinary skill in the art will understand that the functions of these blocks may be implemented in various ways, specifically, only by one of the hardware and software, or by a combination thereof. These functions are not limited to any one of them.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The example embodiments relate to a technology for utilizing a bandwidth by using a plurality of transmission paths, specifically, by allocating a flow in accordance with respective bandwidths of transmission paths such that a transmission capacity is increased. When each of the transmission paths is established by a plurality of wireless transmission apparatuses, a bandwidth of wireless communication is likely to fluctuate by influence of weather or the like. Thus, path control against the bandwidth fluctuation is particularly important.

FIG. 1 is a block diagram showing a configuration of a packet transmission apparatus according to the example embodiments. As shown in FIG. 1, a packet transmission system 100 includes terminal apparatuses 101 and 102, a first transmission path 1 connected to the terminal apparatuses 101 and 102 and including a first wireless zone 103, a second transmission path 2 connected to the terminal apparatuses 101 and 102 and including a second wireless zone 104, a bandwidth monitoring unit 105 configured to monitor bandwidth information of the first wireless zone 103 and bandwidth information of the second wireless zone 104, and a path switching unit 106 configured to determine respective minimum bandwidth values of the first transmission path 1 and the second transmission path 2 on the basis of the bandwidth information of the first wireless zone 103 and the bandwidth information of the second wireless zone 104, and to determine through which of packet transmission paths packets are transmitted on the basis of results of the determination of the respective minimum bandwidth values.

In such a way, according to the example embodiments, the transmission paths can be switched to each other after the respective minimum bandwidths of the transmission paths have been determined. Thus, in case where a bandwidth decrease occurs in one of the transmission paths, the one of the transmission paths can be switched to another one of the transmission paths. By doing so, unnecessary frame loss can be suppressed. The example embodiments are described in detail hereinafter.

First Example Embodiment

Figure 2:
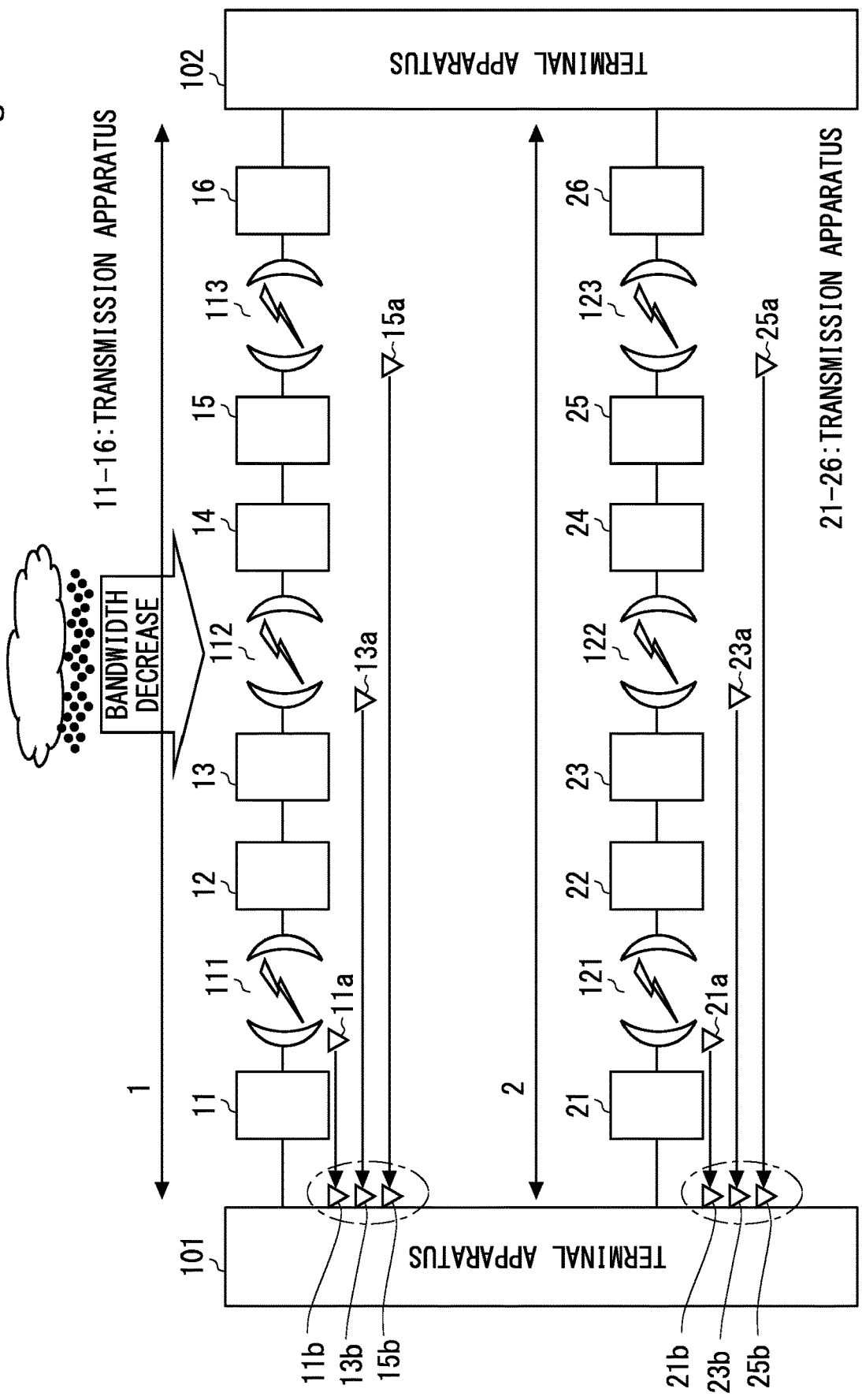
FIG. 2 is a block diagram showing a configuration of a packet transmission apparatus according to a first example embodiment.

FIG. 2 is a block diagram showing a configuration of a packet transmission apparatus according to a first example embodiment. In the example shown in FIG. 2, the terminal apparatus 101 and the terminal apparatus 102 are provided at respective ends of the first transmission path 1 and the second transmission path 2. Note that an operation to switch the first transmission path 1 to the second transmission path 2 in a case where a bandwidth decrease occurs in the first transmission path 1 is described hereinafter.

The first transmission path 1 includes six transmission apparatuses 11, 12, 13, 14, 15, and 16. These transmission apparatuses 11, 12, 13, 14, 15, and 16 are connected in series to each other in this order. A wireless zone 111 is provided between the transmission apparatus 11 and the transmission apparatus 12, a wireless zone 112 is provided between the transmission apparatus 13 and the transmission apparatus 14, and a wireless zone 113 is provided between the transmission apparatus 15 and the transmission apparatus 16.

In addition, the second transmission path 2 includes six transmission apparatuses 21, 22, 23, 24, 25, and 26. These transmission apparatuses 21, 22, 23, 24, 25, and 26 are connected in series to each other in this order. A wireless zone 121 is provided between the transmission apparatus 21 and the transmission apparatus 22, a wireless zone 122 is provided between the transmission apparatus 23 and the transmission apparatus 24, and a wireless zone 123 is provided between the transmission apparatus 25 and the transmission apparatus 26.

In each of these transmission apparatuses, a MEP (Maintenance association End Point) for transmitting bandwidth information of a corresponding one of the wireless zones toward the terminal apparatus 101 (hereinafter, referred to as a server MEP) is arranged. In the example shown in FIG. 2, a server MEP 11a provided in the transmission apparatus 11 corresponds to the wireless zone 111, a server MEP 13a provided in the transmission apparatus 13 corresponds to the wireless zone 112, and a server MEP 15a provided in the transmission apparatus 15 corresponds to the wireless zone 113. In addition, a server MEP 21a provided in the transmission apparatus 21 corresponds to the wireless zone 121, a server MEP 23a provided in the transmission apparatus 23 corresponds to the wireless zone 122, and a server MEP 25a provided in the transmission apparatus 25 corresponds to the wireless zone 123.

Examples of means for notifying about the bandwidth information are specified, for example, by ITU-T (International Telecommunication Union-Telecommunication Standardization Sector) recommendation. More specifically, according to ITU-T recommendation G.8013/Y.1731, ETH-BN (Ethernet Bandwidth Notification) as one of functions of Ethernet OAM is specified as the means for notifying about the bandwidth information. In order to establish paths wirelessly through several zones, the terminal apparatus that performs routing needs to monitor respective bandwidths of the wireless zones. Each of the server MEPs transmits the bandwidth information toward the terminal apparatus 101 via an ETH-BN message (BNM packets) according to the ITU-T recommendation.

In the terminal apparatus 101, MEPs for receiving the bandwidth information items respectively from the server MEPs (hereinafter, referred to as client MEPs) are arranged in one-to-one correspondence to the server MEPs. In the example shown in FIG. 2, client MEPs 11b, 13b, and 15b are provided correspondingly to the server MEPs 11a, 13a, and 15a, respectively. In addition, client MEPs 21b, 23b, and 25b are provided correspondingly to the server MEPs 21a, 23a, and 25a, respectively.

Next, referring back to FIG. 1, an operation of the packet transmission system 100 according to the first example embodiment is described. The terminal apparatus 101 performs flow identification on the basis of information such as a reception port for incoming traffic and values of a VLAN ID (a Virtual LAN IDentifier) and CoS (Class of Service), determines a destination of allocation of incoming traffic (the first transmission path 1 or the second transmission path 2) under a predetermined flow condition, and transmits the allocated incoming traffic to the destination.

The server MEPs arranged in the first transmission path 1 and the second transmission path 2 correspond respectively to the different wireless zones. In each of the wireless zones, the bandwidth monitoring is performed by a corresponding one of the server MEPs. In addition, each of the server MEPs transmits the generated bandwidth information toward the terminal apparatus 101 via the BNM packets. Note that, by the above-described recommendation, cycles of transmitting the BNM packets are defined as 1 second, 10 seconds, and 1 minute. When the bandwidth fluctuation does not occur, the server MEPs transmit the BNM packets in the defined cycles. Meanwhile, when the server MEPs detect the bandwidth fluctuation in their corresponding zones, the server MEPs immediately transmit the BNM packets.

The terminal apparatus 101 receives the BNM packets from the server MEPs arranged in the first transmission path 1 and the second transmission path 2, and determines the minimum bandwidth values by comparing the bandwidth information items in each of the wireless transmission paths with each other. The terminal apparatus 101 uses these minimum bandwidth values as the respective bandwidths of the transmission paths, that is, as conditions for determining whether or not to switch the paths to each other. Specifically, the terminal apparatus 101 compares the bandwidth information items received by the client MEPs 11b, 13b, and 15b with each other, and determines a smallest one of these bandwidth values as the bandwidth value of the first transmission path 1. In addition, the terminal apparatus 101 compares the bandwidth information items received by the client MEPs 21b, 23b, and 25b with each other, and determines a smallest one of these bandwidth values as the bandwidth value of the second transmission path 2. Note that when the reception of the BNM packets in the fixed cycles stops, the bandwidth of a corresponding one of the transmission paths may be regarded as zero.

By causing each of the transmission apparatuses to perform the bandwidth monitoring in the corresponding one of the wireless zones, and by causing the terminal apparatus 101 to receive the bandwidth information of each of the wireless zones in such a way, the minimum bandwidth of each of the transmission paths can be recognized. The terminal apparatus 101 can determine through which of the packet transmission paths the packets are transmitted on the basis of results of the determination of the minimum bandwidths.

In other words, the terminal apparatus 101 can switch the transmission paths to each other under the flow condition of the packets to be transferred by recognizing the respective minimum bandwidths of the transmission paths on the basis of the bandwidth information received from each of the transmission apparatuses. This enables the terminal apparatus to switch the one of the transmission paths to the other one of the transmission paths in the case where the bandwidth decrease occurs in one of the transmission paths. As a result, unnecessary frame loss can be suppressed.

Second Example Embodiment

Figure 3:
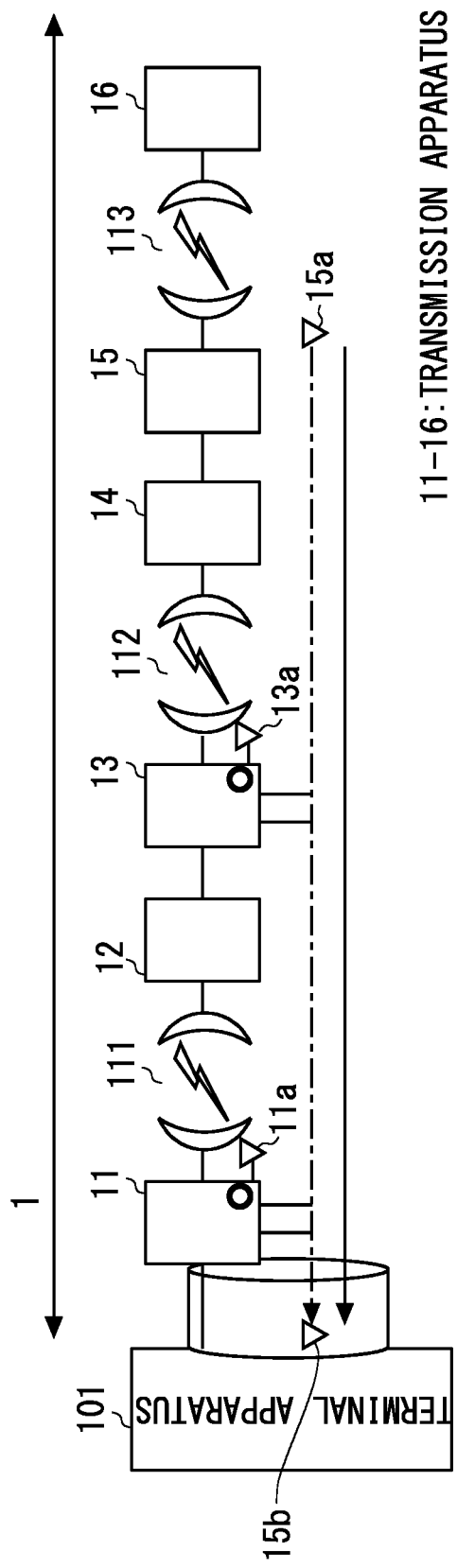
FIG. 3 is a diagram showing a part of a configuration of a packet transmission apparatus according to a second example embodiment.
Figure 4:
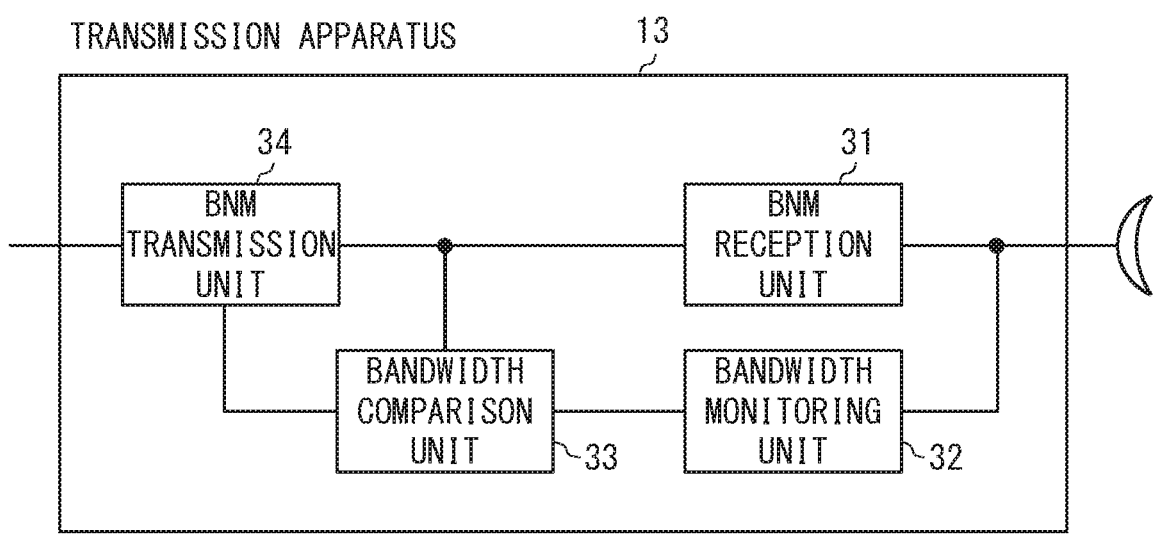
FIG. 4 is a block diagram showing a configuration of a transmission apparatus according to the second example embodiment.

FIG. 3 is a diagram showing a part of a configuration of a packet transmission apparatus according to a second example embodiment. FIG. 3 shows only a part of the first transmission path 1. In addition, FIG. 4 is a block diagram showing a configuration of a transmission apparatus according to the second example embodiment. The second example embodiment is different from the first example embodiment in that the transmission apparatuses configured as shown in FIG. 4 are used as the transmission apparatus 11 corresponding to the first wireless zone 111 and the transmission apparatus 13 corresponding to the second wireless zone 112. Note that, similarly, the transmission apparatuses configured as shown in FIG. 4 are used also as the transmission apparatuses 21 and 23 in the second transmission path 2.

As shown in FIG. 3, in the transmission apparatus 15 that is a farthest one of the transmission apparatuses configured to perform the bandwidth monitoring as viewed from the terminal apparatus 101, the server MEP 15a configured to monitor a bandwidth of the wireless zone 113 and to transmit the BNM packets toward the terminal apparatus 101 is arranged. In addition, in the terminal apparatus 101, the single client MEP 15b for receiving the bandwidth information is arranged correspondingly to the server MEP 15a.

The BNM packets transmitted from the server MEP 15a reach the terminal apparatus 101 via the transmission apparatus 13 and the transmission apparatus 11. Note that each of the transmission apparatuses 13 and 11 includes means for comparing corresponding bandwidth information of a corresponding zone and subsequent bandwidth information contained in the BNM packets received from a subsequent transmission apparatus with each other.

FIG. 4 shows a configuration of the transmission apparatus 13 as an example. The transmission apparatus 13 includes a BNM reception unit 31, a bandwidth monitoring unit 32, a bandwidth comparison unit 33, and a BNM transmission unit 34. The BNM reception unit 31 is configured to extract the bandwidth information of the BNM packets received from the subsequent transmission apparatus 15, to output the extracted bandwidth information to the bandwidth comparison unit 33, and to transmit the received BNM packets as they are to the BNM transmission unit 34. The bandwidth monitoring unit 32 is configured to monitor the bandwidth of the corresponding wireless zone 112, and to output the bandwidth as corresponding bandwidth information to the bandwidth comparison unit 33.

The bandwidth comparison unit 33 is configured to compare the subsequent bandwidth information input from the BNM reception unit 31 and the corresponding bandwidth information input from the bandwidth monitoring unit 32 with each other, and to output a result of the comparison to the BNM transmission unit 34. The BNM transmission unit 34 is configured to output a smaller one of the corresponding bandwidth information and the subsequent bandwidth information.

Figure 5:
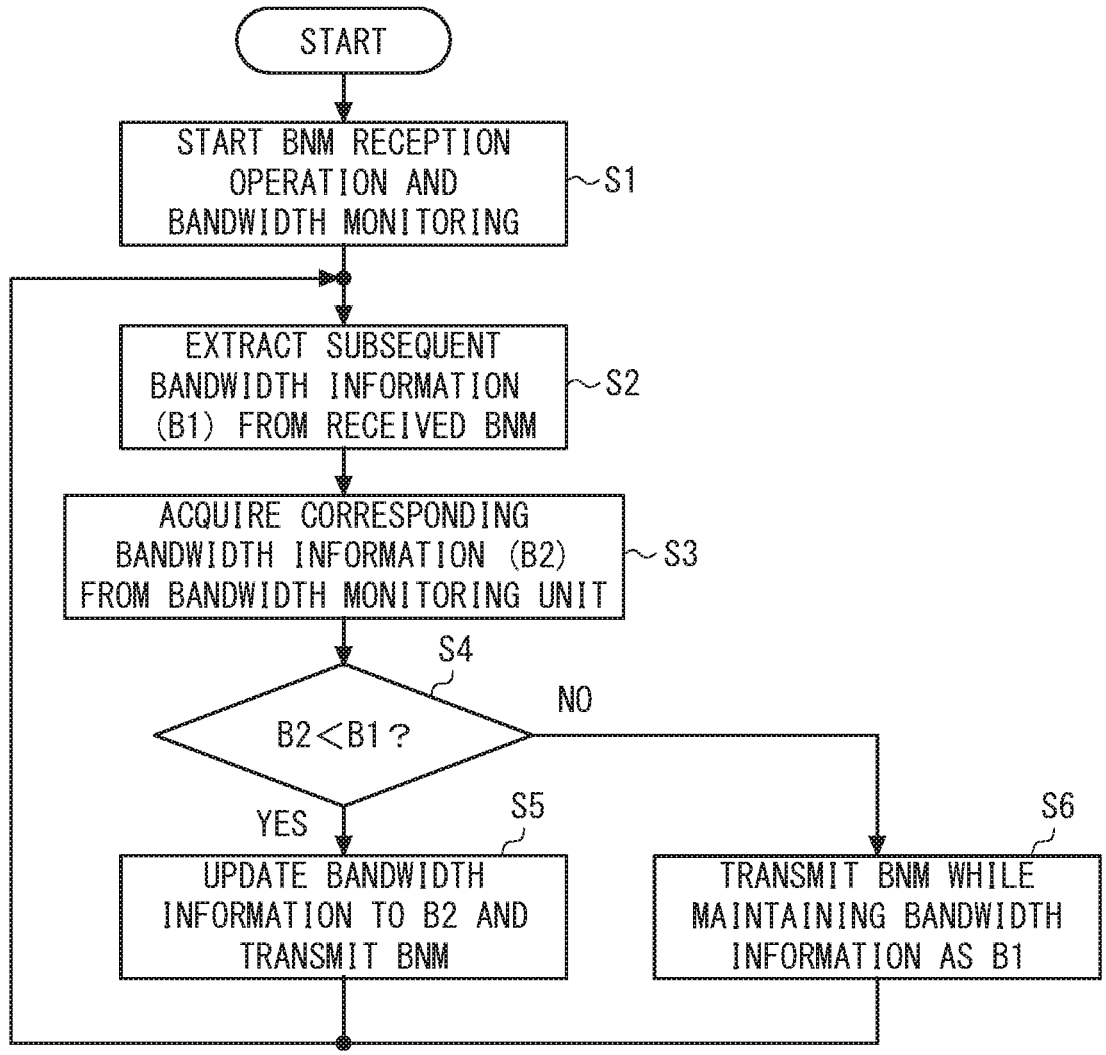
FIG. 5 is an explanatory flowchart showing an operation to relay BNM (Bandwidth Notification Message) packets in the transmission apparatus shown in FIG. 4.

In this context, with reference to FIG. 5, an operation to relay the BNM packets in the transmission apparatus shown in FIG. 4 is described. First, in response to setting of the server MEP 13a, the BNM reception unit 31 starts a BNM reception operation, and the bandwidth monitoring unit 32 starts the bandwidth monitoring (Step S1). Then, in response to the reception of the BNM packets from the subsequent apparatus, the BNM reception unit 31 extracts the subsequent bandwidth information (B1) from the received BNM packets, and outputs the extracted bandwidth information to the bandwidth comparison unit 33 (Step S2).

Next, the bandwidth comparison unit 33 acquires the corresponding bandwidth information (B2) of the corresponding zone from the bandwidth monitoring unit 32 (Step S3), and determines whether or not the corresponding bandwidth information (B2) on the corresponding zone is smaller than the subsequent bandwidth information (B1) extracted from the BNM packets (Step S4). When the corresponding bandwidth information (B2) is smaller than the subsequent bandwidth information (B1) (YES in Step S4), the BNM transmission unit 34 updates the bandwidth information of the received BNM packets to the corresponding bandwidth information (B2), and transmits this BNM packets to an outside of the apparatus (Step S5).

Meanwhile, in Step S4, when the bandwidth information (B2) of the corresponding zone is equal to or larger than the subsequent bandwidth information (B1), the BNM transmission unit 34 maintains the bandwidth information of the received BNM packets as the subsequent bandwidth information (B1), and transmits the BNM packets to the outside of the apparatus (Step S6).

After that, also in the transmission apparatus 11, the subsequent bandwidth information of the BNM packets input from the subsequent transmission apparatus 13 and the corresponding bandwidth information of the corresponding wireless zone 111 are similarly compared with each other. A smaller one of the bandwidth information items is transmitted as the BNM packets toward the terminal apparatus 101.

As described above, according to the second example embodiment, the terminal apparatus 101 need not execute a bandwidth comparing process. Thus, an increase in CPU load can be avoided, and a processing time necessary for switching the transmission paths to each other can be reduced. In addition, only by arranging the single server MEP and the single client MEP in each of the transmission paths, the minimum bandwidth of each of the wireless transmission paths can be monitored. Thus, dispensation management of a MEP resource in a network is facilitated.

Note that the present disclosure is not limited to the above-described example embodiments, and may be varied as appropriate within the gist of the present disclosure.

The first and second example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

(Supplementary Note 1)

A transmission-path switching program for causing a computer to execute:

a process of monitoring bandwidth information of a first wireless zone in a first transmission path and bandwidth information of a second wireless zone in a second transmission path, the first transmission path and the second transmission path being connected to terminal apparatuses;

a process of determining respective minimum bandwidth values of the first transmission path and the second transmission path on the basis of the bandwidth information of the first wireless zone and the bandwidth information of the second wireless zone; and a process of determining through which of packet transmission paths packets are transmitted on the basis of results of the determination of the respective minimum bandwidth values.

What is claimed is:

1. A packet transmission system comprising:
   terminal apparatuses;
   a first transmission path connected to the terminal apparatuses and including a first wireless zone;
   a second transmission path connected to the terminal apparatuses and including a second wireless zone;
   wherein each of the terminal apparatuses comprises:
     at least one memory having stored therein program instructions and at least one processor that when executing the first program instructions implements:
       a bandwidth monitoring unit configured to monitor bandwidth information of the first wireless zone and bandwidth information of the second wireless zone; and
       a path switching unit configured to determine respective minimum bandwidth values of the first transmission path and the second transmission path on the basis of the bandwidth information of the first wireless zone and the bandwidth information of the second wireless zone, and to determine through which of packet transmission paths packets are transmitted on the basis of results of the determination of the respective minimum bandwidth values,
   wherein
     the first transmission path includes a first transmission apparatus connected to the terminal apparatuses,
     the second transmission path includes a second transmission apparatus connected to the terminal apparatuses, and
     the bandwidth monitoring unit is provided for each of the first transmission apparatus and the second transmission apparatus, and
   wherein
     the first transmission apparatus in the first transmission path includes a plurality of first transmission apparatuses connected in series to each other,
     the first wireless zone in the first transmission path includes a plurality of first wireless zones,
     the bandwidth monitoring unit of each of the plurality of first transmission apparatuses monitors corresponding bandwidth information of a corresponding one of the plurality of first wireless zones,
     the second transmission apparatus in the second transmission path includes a plurality of second transmission apparatuses connected in series to each other,
     the second wireless zone in the second transmission path includes a plurality of second wireless zones, and
     the bandwidth monitoring unit of each of the plurality of second transmission apparatuses monitors corresponding bandwidth information of a corresponding one of the plurality of second wireless zones.

2. The packet transmission system according to claim 1, wherein
   the at least one memory and the at least one processor of each of the plurality of first transmission apparatuses further implements a bandwidth comparison unit configured to compare the corresponding bandwidth information of the corresponding one of the plurality of first wireless zones and subsequent bandwidth information to be input from a subsequent one of the plurality of first transmission apparatuses with each other, and
   each of the plurality of first transmission apparatuses is configured to output a smaller one of the corresponding bandwidth information and the subsequent bandwidth information.

3. The packet transmission system according to claim 2, wherein the at least one memory and the at least one processor of each of the plurality of first transmission apparatuses further implements:
   a BNM (Bandwidth Notification Message) reception unit configured to extract the subsequent bandwidth information from a BN message to be input from the subsequent one of the plurality of first transmission apparatuses, and to input the subsequent bandwidth information to the bandwidth comparison unit; and
   a BNM transmission unit configured to update the subsequent bandwidth information extracted from the BN message to the corresponding bandwidth information when the corresponding bandwidth information is smaller than the subsequent bandwidth information, and to output the updated BN message.

4. The packet transmission system according to claim 1, wherein
   the path switching unit is provided to one of the terminal apparatuses, and
   the bandwidth monitoring unit is configured to notify the one of the terminal apparatuses of the bandwidth information of the first wireless zone and the bandwidth information of the second wireless zone.

5. A transmission-path switching method comprising:
   monitoring bandwidth information of a first wireless zone in a first transmission path and bandwidth information of a second wireless zone in a second transmission path, the first transmission path and the second transmission path being connected to terminal apparatuses;
   determining respective minimum bandwidth values of the first transmission path and the second transmission path on the basis of the bandwidth information of the first wireless zone and the bandwidth information of the second wireless zone, and
   determining through which of packet transmission paths packets are transmitted on the basis of results of the determination of the respective minimum bandwidth values,
   wherein
     the first transmission path includes a first transmission apparatus connected to the terminal apparatuses, and
     the second transmission path includes a second transmission apparatus connected to the terminal apparatuses,
   wherein each of the terminal apparatuses comprises:
     at least one memory having stored therein program instructions and at least one processor that when executing the first program instructions implements:

a bandwidth monitoring unit is-provided for each of the first transmission apparatus and the second transmission apparatus, and wherein the first transmission apparatus in the first transmission path includes a plurality of first transmission apparatuses connected in series to each other, the first wireless zone in the first transmission path includes a plurality of first wireless zones, the bandwidth monitoring unit of each of the plurality of first transmission apparatuses monitors corresponding bandwidth information of a corresponding one of the plurality of first wireless zones, the second transmission apparatus in the second transmission path includes a plurality of second transmission apparatuses connected in series to each other, the second wireless zone in the second transmission path includes a plurality of second wireless zones, and the bandwidth monitoring unit of each of the plurality of second transmission apparatuses monitors corresponding bandwidth information of a corresponding one of the plurality of second wireless zones.

\* \* \* \* \*